United States Patent Office.

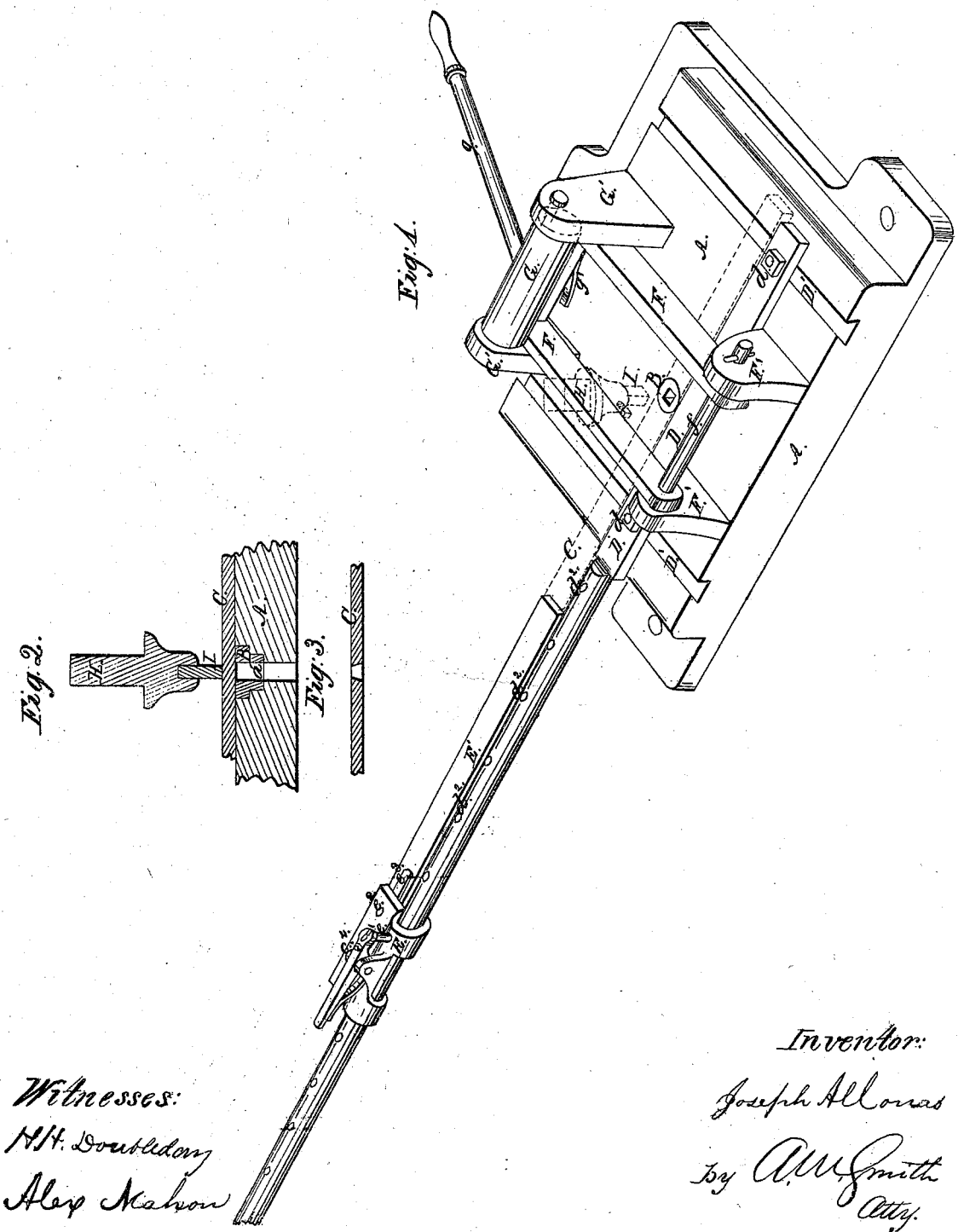

JOSEPH ALLONAS, OF MANSFIELD, OHIO, ASSIGNOR TO C. AULTMAN AND H. H. TAYLOR, OF SAME PLACE.

Letters Patent No. 94,857, dated September 14, 1869.

IMPROVED MACHINE FOR PUNCHING METAL.

The Schedule referred to in these Letters Patent and making part of the same.

*To all whom it may concern:*

Be it known that I, JOSEPH ALLONAS, of Mansfield, in the county of Richland, and State of Ohio, have invented or discovered a new and useful Improvement in Machines for Punching Metals, of which the following is a full, clear, and exact description, reference being had to the accompanying drawings, making part of this specification, in which—

Figure 1 is a perspective view of the machine;

Figure 2 is a vertical sectional view of the bed-piece, die, and punch, through the line $x\ y$; and Figure 3 is a sectional view of a bar of metal after having been punched.

Similar letters of reference indicate corresponding parts in all the figures.

In the manipulation of wrought metals, for the purpose of giving them the desired form or construction, or for uniting different parts or pieces thereof, for the various purposes and uses for which they are required, it has been found desirable to make sockets or perforations of tapering form, adapted to receive shanks of corresponding or wedge-form, which can be forced or driven into the sockets until they are made accurately to fit and fill the same, and thereby effect a perfectly rigid and inflexible union of the parts.

This has been found desirable, because of the difficulty and expense of uniting such parts in a manner that will prevent all relative movements, by attempting to give to the socket and shank an uniform diameter throughout, a task requiring the utmost precision and nicety of fitting, and one which, even under the hand of the most skilful workman, frequently results in failure to attain the desired end.

Where the socket or perforation and shank are round, the task is less difficult, because, in such case, the lathe may be employed, but where a square or angular form of socket and shank is required, such as cannot be produced by the lathe, and yet is essential, to prevent the turning of the shank in its socket, the process becomes much more difficult of accomplishment.

As a consequence, in machines where such a union of parts is essential to the proper working of the same, as, for example, in the attachment of the teeth to the cylinder-bars in threshing-machines, where a slight displacement of a tooth would result disastrously, and to the injury, or, perhaps, the destruction of the machine, and in a manner that would endanger the lives of the attendants, the desired accuracy in uniting the parts is frequently unattained, because of the labor and expense referred to, and where it is attained, it not unfrequently happens that after short use, the parts become worn and loosened, and the nuts or other fastenings employed, while they serve to hold the teeth in the socket, are found insufficient to prevent their lateral displacement.

If a wedge or tapering form of socket and shank be used, it will be evident that all such wear will be compensated for by simply tightening the nuts, or other fastenings which bind the two parts together, and the accurate fitting, and consequent labor and expense incident to the employment of perforations and shanks of uniform size, as above explained, will be obviated.

My invention has for its object the provision of means adapted to punch holes of tapering form in plates or bars of metal, in a manner resembling the ordinary process of punching holes of uniform diameter or size, and whereby advantages such as are above recited are attained, without adding to the cost of effecting the perforation of the metal.

The character of the means employed for the accomplishment of this object will be best understood from the following description, with reference to the drawing, in which—

A is a bed-plate, perforated and countersunk to receive a die, shown at B, fig. 2.

C represents a bar of metal to be punched, and

D, a guide-bar, for effecting the desired lateral adjustment of the bar C, relative to the die B, and also in connection with the gauge E, making the desired longitudinal adjustment of said bar C.

The guide-bar D is secured to and adjusted upon the bed-piece A by means of the bolts $d$, the heads of which are confined in the dovetailed groove D'.

The gauge E is constructed so as to slide upon the bar D, and is provided with a tongue or arm, E'.

The head E is stopped at the desired intervals or distances by means of the pin $e$, actuated by the spring-latch $e'$, and entering the holes $d^2$, in bar D, an accurate adjustment of the tongue E', relative to the die B, can be made through the slots $e^3$ and screws or bolts $e^4$.

F is a clamp, consisting of two arms, united at one end by a transverse bar, the opposite ends being pivoted in lugs F' F', upon the rod $f$.

G is a cam-roller, mounted in standards G' G', and rotated by means of the lever $g$.

A spring, $g'$, serves to raise the free end of the clamp F, when the same is not held down by cam-roller G.

H is a stock, to which is given a direct reciprocating motion, on a line coincident with the axial diameter of the die B and perforation $a$.

I is a punch of any desired form, but of less diameter than the die or perforation $a$, and is secured in stock H, in the usual manner.

The operation of the machine is as follows:

The guide-bar D is secured upon the face of the bed-plate A in such position, that when the bar C is laid closely against it, the guide-bar shall be in a proper position, with reference to the perforation through the die B. The bar C is then adjusted longitudinally, that is, so that the point at which it is desired to punch the first hole shall be exactly over the die, then the gauge E is moved up as closely to the end of the bar as it can be, and allows the pin $e$ to enter one of the holes $d^2$. An accurate adjustment is then made by loosening the screws or bolts $e^1$, and placing the end of the tongue E' against the end of the bar C, as shown in fig. 1.

It will be apparent that after the above-described adjustment shall have been effected, any number of bars may be punched, with perfect uniformity in the distance between the holes, by simply sliding both bar and gauge along until the pin $e$ will enter successively the holes $d^2$.

In using the machine, it will be found that if a punch, having a smaller diameter than the diameter of the perforation through the die, be used, it will force out a tapering plug, corresponding in size at one end with the hole in the die, and at the other with the punch.

The principle upon which this is done appears to be that the inner edges of the die act as cutting or shearing-edges equally with the outer edges of the punch, and that as the power applied to the punch is virtually applied to the die, to the same extent, although in an opposite direction, the tendency is just the same for the die to cut a plug of its own size, as for the punch to make a hole of its size. The result is a compromise, as it were, on a straight line between the two points of resistance or cutting-edges $b\ b\ i\ i$, fig. 2, thereby producing a tapering perforation, having straight sides, as shown at $c$, fig. 3.

In order to prevent the bar C from being warped or sprung, thereby involving the necessity for subsequently staightening and consequent changing of the relative position of the holes, it (the bar) is held firmly to the bed-plate A by the clamp F, one arm of which rests upon the bar on either side of the punch, the requisite pressure being applied by means of the cam-roller G, while each hole is being punched, but the bar is released, so as to be readily moved along, ready for the next one, by reversing the position of the lever $g$ and cam G, when the spring $g'$ will lift the clamp F.

Having now described my invention,

What I claim as new, and desire to secure by Letters Patent, is—

1. In combination with a machine for punching metals, the adjustable guide-bar D, provided with a perforated extension and the sliding gauge E, operating substantially as set forth.

2. In combination with a machine for punching metals, the adjustable guide-bar D, provided with a perforated extension, the sliding gauge E, and the tongue E'.

3. The combination of the bed-plate A, lugs F'', levers F, cammed lever G $g$, lugs G', and guide-bar D.

JOSEPH ALLONAS.

Witnesses:
J. W. JENNER,
V. GUTZWILLER, Jr.